United States Patent [19]
Lang et al.

[11] Patent Number: 5,196,965
[45] Date of Patent: Mar. 23, 1993

[54] REAR-VIEW UNIT FOR MOTOR-VEHICLES

[75] Inventors: Heinrich Lang, Ergersheim; Wolfgang Seiboth, Bad Windsheim, both of Fed. Rep. of Germany

[73] Assignee: Mekra Rangau Plastics GmbH & Co. KG, Fed. Rep. of Germany

[21] Appl. No.: 764,502

[22] Filed: Sep. 20, 1991

[30] Foreign Application Priority Data

Sep. 21, 1990 [DE] Fed. Rep. of Germany ....... 4029890

[51] Int. Cl.$^5$ .............................................. G02B 5/08
[52] U.S. Cl. .................................. 359/841; 359/843; 359/876; 359/877
[58] Field of Search ............... 359/841, 843, 844, 876, 359/877

[56] References Cited

U.S. PATENT DOCUMENTS

| | | | |
|---|---|---|---|
| 4,428,649 | 1/1984 | Main et al. | 359/877 |
| 4,609,265 | 9/1986 | McKee et al. | 359/843 |
| 4,798,967 | 1/1989 | Yamana et al. | 248/479 |
| 4,820,032 | 4/1989 | Thompson, Jr. | 359/843 |
| 5,056,905 | 10/1991 | Jensen | 359/843 |

FOREIGN PATENT DOCUMENTS

| | | | |
|---|---|---|---|
| 0274848 | 7/1988 | European Pat. Off. | 359/877 |
| 0341080 | 11/1989 | European Pat. Off. | |
| 0361166 | 4/1990 | European Pat. Off. | |
| 2506073 | 8/1976 | Fed. Rep. of Germany | |
| 3149141 | 6/1983 | Fed. Rep. of Germany | |
| 2578046 | 8/1986 | France | |
| 55-184416 | 7/1982 | Japan | 359/841 |
| WO90/10555 | 9/1990 | PCT Int'l Appl. | |

Primary Examiner—Bruce Y. Arnold
Assistant Examiner—J.P. Ryan
Attorney, Agent, or Firm—Laff, Whitesel, Conte & Saret

[57] ABSTRACT

A rear-view unit for motor-vehicles, in particular commercial vehicles, has at least one external rear-view mirror with a housing and at least one mirror glass pivotably arranged in the housing. Electric servomotors are provided to pivot the mirror glasses about a positioning axis. Furthermore, heatings for the mirror glass may be available. Switches are provided to actuate the servomotors and the heating. So as to reduce the wiring and to ensure the subsequent equipment of adjustable mirror glasses with servomotors, the switches are connected to a transmitting unit and the servomotors are connected to a receiving unit of a multiplex system arranged in the housing.

19 Claims, 5 Drawing Sheets

REAR-VIEW UNIT FOR MOTOR-VEHICLES

FIELD OF THE INVENTION

The invention relates to a rear-view unit for motor-vehicles with at least one external rear-view mirror with a housing, with at least one pivotable mirror glass, with at least one electric servomotor for pivoting at least the mirror glass about a positioning axis, with a mirror switch remote from the housing to connect the at least one servomotor with a current supply via at least one electric line.

BACKGROUND OF THE INVENTION

Rear-view units of the generic type, in particular for commercial vehicles, as a rule have two servomotors for each mirror glass of an external mirror, in order to ensure adjustments about a horizontal and/or vertical positioning axis. The associated control switch or switches are in the driver's cabin or in the passenger cabin of the vehicle. In like manner the mirror glasses are usually provided with a heating which is equally actuated by an on-off switch from inside the driver's cabin. Finally, in some countries the housings of the external rear-view mirrors are provided with an additional lamp equally actuated by an on-off switch from the driver's cabin. These numerous electric consumers in the external rear-view mirror or in the external rear-view mirrors necessitate comparatively thick and expensive cables between the switches in the driver's cabin and the electric consumers situated outside the driver's cabin in the external rear-view mirror or mirrors. On the one hand this is rather costly, and on the other hand this complicates any subsequent equipment of a motor-vehicle with electrically adjustable external rear-view mirrors, when the vehicle had before only been provided with one or several manually adjustable, but heatable external rear-view mirrors.

So-called multiplex systems for motor-vehicles have been disclosed for instance by DE 25 06 073 C2. In this case a ring line to which a transmitting unit is associated is provided within a motor-vehicle. Each consumer is associated with a receiving unit. The instructions coded in the transmitting unit and entered via a plurality of actuating switches are decoded in the receiving unit connected in series before the associated consumer so that the corresponding consumer is triggered. Such multiplex systems only have one transmitting unit; but as a rule they have as many receiving units as consumers. The triggering of several consumers via one receiving unit is not possible. Further, a breakdown of the multiplex system will cause the electricity supply of the whole vehicle to collapse. Compared with this the electricity supply of the external rear-view mirrors of a motor-vehicle is of no substantial importance for the reliability of operation of the vehicle, since the external rear-view mirrors can always be adjusted manually. This possibility of manual adjustment is ensured by friction clutches generally provided for electrically actuatable external rear-view mirrors.

SUMMARY OF THE INVENTION

It is therefore the object of the invention to embody a rear-view unit of the generic kind such that costly cables are avoided and subsequent equipment with electrically adjustable external mirrors is possible.

This object is attained in accordance with the invention by the the mirror switch being connected to a transmitting unit and the at least one servomotor being connected to a receiving unit of a multiplex system arranged in the housing and by the at least one electric line being in the form of a data bus between said transmitting unit and said receiving unit. According to the invention a multiplex system is provided requiring only one or at maximum two electric lines between a control unit located in the driver's cabin and an external rear-view mirror with an arbitrary number of electric consumers. Since thick cables are very expensive, even the first equipment of a vehicle is economic, the transmitting unit and the receiving unit not being more expensive than the cables. Even the production of the vehicle is simplified, since the decision of whether or not to install motor-adjustable external rear-view mirrors only has to be made when the vehicle is virtually finished, since in each case only one or at maximum two lines have to be provided for each external rear-view mirror. Subsequent equipment is feasible in a simple manner, too, the more so as one or two lines leading to an external rear-view mirror are as a rule anyway available, since these are regularly provided to be heatable even when they are only manually adjustable. It is also possible to trigger all the electric consumers arranged in an external rear-view mirror only via one pair of lines simultaneously supplying them with current.

An embodiment with the usual structure of motor-adjusted external rear-view mirrors consists in that two servomotors are provided for each mirror glass, which are connected to the receiving unit.

The embodiment according to which at least two external rear-view mirrors are provided with a receiving unit each and are connected with a common transmitting unit via data busses ensures that two external rear-view mirrors each with a receiving unit can be triggered independently of each other by a single control unit with a single transmitting unit. By the embodiment according to which at least one mirror glass is provided with a heating, which is connected to the receiving unit, and according to which an on-off switch for the heating is connected to the transmitting unit, it is possible to trigger the heating of at least one mirror glass via the multiplex system. By the embodiment according to which at least one lamp is arranged on the housing and is connected to the receiving unit and according to which an on-off switch for the lamp is connected to the transmitting unit, it is possible to trigger the additional lamp via the multiplex system.

By the at least one servomotor being connected with the rotary position indicator, which is connected to the receiving unit, and by the transmitting unit being provided with at least one storage location triggerable by way of a storage location key and a storage switch to store and repeatedly trigger a predeterminable position of the at least one mirror glass the multiplex system can additionally be coupled with a memory system allowing a plurality of drivers to choose the individual position of the mirror glass or the mirror glasses only once, to fetch this date by pressing a key and to readjust the individual position. In like manner a totally different position of the mirror glasses can thus be stored and fetched for a single driver, for example for normal driving and backward manoeuvres.

When driving trucks there is the problem that in particular during manoeuvring and also for driving around narrow street corners, when the truck is extremely turned in, the end of the trailer or semi-trailer gets out the visual range of the rear-view mirror. Thus, it is no longer possible to control by means of the mirrors whether the end of the trailer runs over the curb or any other obstacle. As a consequence, the driver must control manoeuvring by trying to get a direct view of the end of the trailer, which does not particularly serve to make driving safer and more comfortable.

The basic solution of this problem is given by an embodiment of the invention according to which the transmitting unit of the multiplex system is associated with an angle detection equipment detecting the angle between the longitudinal axes parallel to the direction of travel of the truck and trailer, by means of which equipment the position of the mirror glass or glasses is automatically adjustable corresponding to the angle via the multiplex system. Accordingly, the transmitting unit of the multiplex system is provided with an angle detection equipment detecting the angle between the longitudinal axes of truck and trailer parallel to the direction of travel, by means of which equipment the position of the corresponding rear-view mirror or mirrors can be corrected automatically corresponding to the angle between the two parts of the vehicle via the multiplex system. The mirrors or mirror glasses are moved about their vertical axis tracking the angle between the two parts of the vehicle, whereby it is ensured that in particular when driving round narrow street corners or during manoeuvring the end of the trailer can be controlled by way of the corresponding rear-view mirror. This tracking can take place continuously or by steps of for instance 10°.

According to another embodiment the angle detection equipment comprises at least one angle transmitter responding to a change of angle between the truck and the trailer and an evaluation unit to generate control signals for the adjustment of the mirror position, the input of which evaluation unit is connected with the angle transmitter, and the output of which evaluation unit is connected with the transmitting unit.

According to another embodiment the angle transmitter is an incremental transducer by means of which an angle mark on the trailer is detectable.

According to another embodiment two distance sensors each arranged in the vicinity of the side walls of the truck facing away from one another are provided as angle transmitters, by means of each of which a signal can be generated for the evaluation unit, which signal corresponds to the respective distance between the lateral regions of the front of the trailer in the vicinity of the side walls and the distance sensors.

Further advantages and details of the invention will become apparent from the ensuing description of three examples of embodiment of the invention taken in conjunction with the drawing.

DESCRIPTION OF THE PREFERRED EMBODIMENTS

Figure 1:
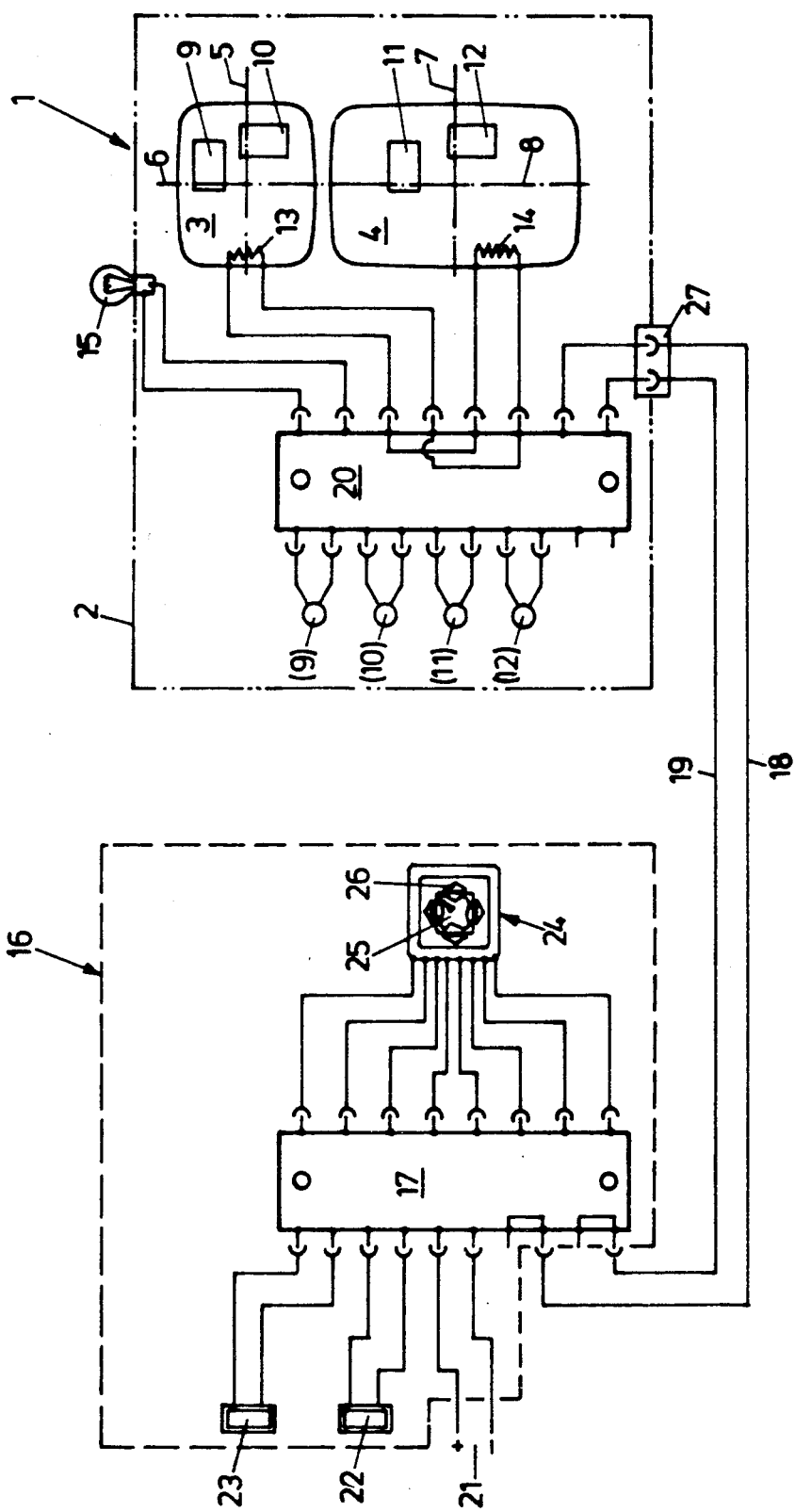
FIG. 1 shows an external rear-view mirror with two mirror glasses and a control unit.

The embodiment illustrated in FIG. 1 is a diagrammatic representation of an external rear-view mirror 1 for commercial vehicles, in particular trucks, of which the housing 2 is only roughly outlined by a dash-double-dotted line. The external rear-view mirror has two mirror glasses 3, 4 adjustable about positioning axes 5, 6 and 7, 8, respectively. A servomotor 9, 10 and 11, 12, respectively, is provided for the adjustment of each mirror glass 3 and 4, respectively, about their two positioning axes 5, 6 and 7, 8, respectively. The servomotor 9 serves to pivot the mirror glass 3 about its horizontal positioning axis 5, i.e. it pivots the mirror glass vertically. The servomotor 10 serves to pivot the mirror glass 3 about its vertical positioning axis 6, i.e. it pivots the mirror glass 3 horizontally. Correspondingly, the servomotor 11 serves to pivot the mirror glass 4 about its horizontal positioning axis 7, i.e. it pivots the mirror glass 4 vertically. Finally, the servomotor 12 serves to pivot the mirror glass 4 about the vertical positioning axis 8, i.e. it pivots the mirror glass 4 horizontally.

The mirror glass 3 is in usual manner provided with a heating 13, while the mirror glass 4 is provided with a heating 14. As it is prescribed in some countries, a lamp 15 can be provided at the top of the housing. Such external rear-view mirrors are known in practice and have for instance been disclosed in German patent application DE 40 10 083 A.

A multiplex system is provided to trigger the servomotors 9 to 12, the heatings 13, 14 and the lamp 15. It comprises a control unit 16, which is to be arranged in the driver's cabin of the commercial vehicle and which is surrounded by a dashed line in FIG. 1. This control unit 16 has a transmitting unit 17 as a basic item which is connected with a receiving unit 20 arranged in the housing 2 by way of a data bus only consisting of two electric lines 18, 19. A current supply 21 with a voltage of 12 or 24 volt usual in such vehicles is connected to corresponding input of the receiving unit 17. Further, an on-off switch 22 for the lamp 15 and an on-off switch 23 for the heatings 13, 14 is connected to corresponding input of the transmitting unit 17. Further, a mirror switch 24 is connected to corresponding input of the transmitting unit 17 and has a rotary switch 25 to elect the mirror glass 3 or 4, respectively, and a slide switch 26 displaceable in two coordinate directions to actuate the servomotors 9, 10 or 11, 12, respectively, associated with the mirror glass 3 or 4, respectively, elected in each case. The rotary switch 25 and the slide switch 26 are integrated one into the other. If—as outlined in FIG. 1—the actuation of the upper mirror glass 3 is elected by the rotary switch 25, then the servomotor 10 is triggered by displacement of the slide switch 26 in horizontal direction and pivots the mirror about the positioning axis 6. If, however, the slide switch 26 is moved in vertical direction, then the mirror glass 3 is correspondingly pivoted about its horizontal positioning axis 5. The electric signals fed to the transmitting unit 17 via the switches 22, 23, 25, 26 are coded in the transmitting unit 17 and together with the supply voltage are fed via the lines 18, 19 forming the data bus to the receiving unit 20 in the housing 2, where, corresponding to the coded signals, a current supply of the lamp 15, the heating 13, 14 or the servomotors 9 to 12 is triggered in the manner described. In FIG. 1 the servomotors 9, 10, 11, 12 are shown as symbols on the left of the receiving unit 20 of the multiplex system so that the lines leading to the servomotors 9 to 12 are illustrated more clearly. The lines 18, 19 are connected or can be connected with the receiving unit 20 via a plug connection 27 in the housing 2.

Even though the switches 22, 23, 24 are shown within the surrounding of the control unit 16, this does not imply their forming a spatially closed unit with the transmitting unit 17; rather, the switches 22, 23, 24 are located at a place within the driver's cabin easy to be reached by the driver, whereas the transmitting unit 17 and all the lines not designated in detail are arranged within the instrument panel, i.e. out of sight.

Figure 2:
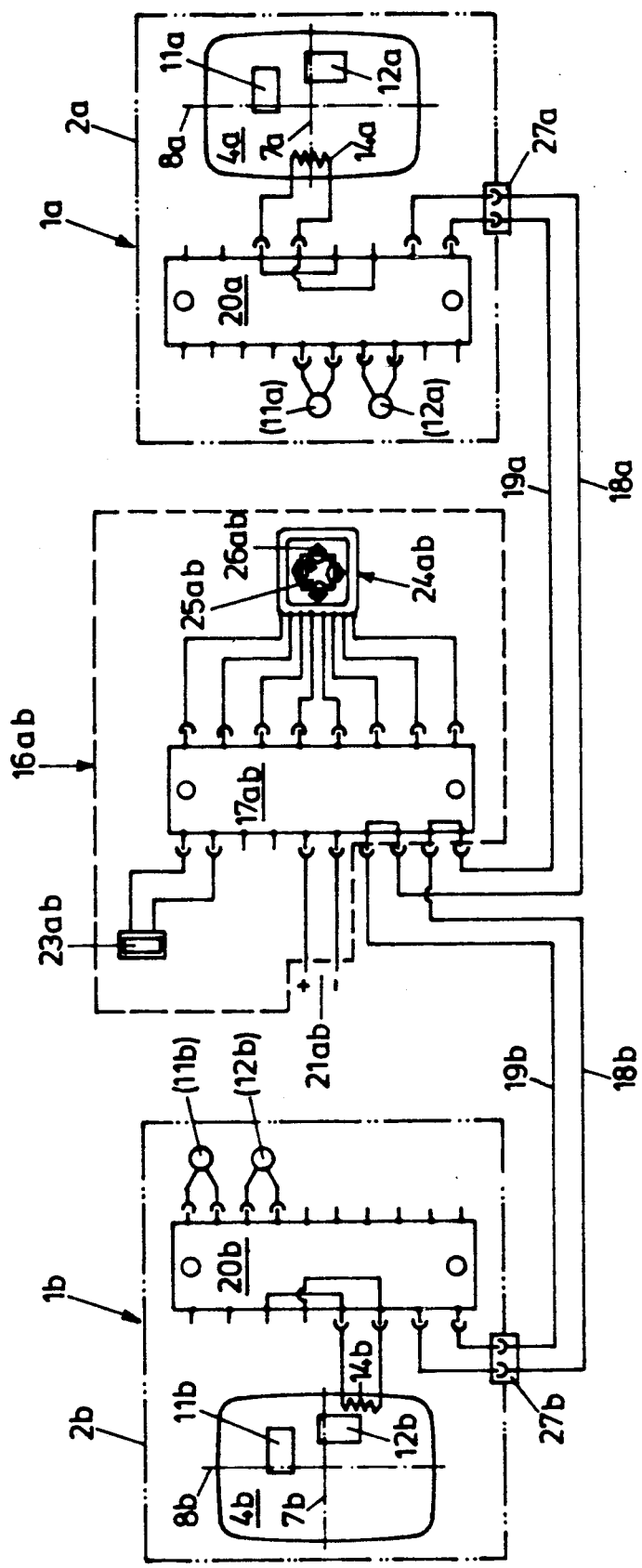
FIG. 2 shows two external rear view mirrors each with a mirror glass and a common control unit.

The embodiment according to FIG. 2 differs from that according to FIG. 1 in that two external rear-view mirrors 1a and 1b are provided each having a housing 2a, 2b, only one—big—mirror glass 4a, 4b being provided in the housing 2a or 2b, respectively, and being adjustable in the manner described by the servomotors 11a, 12a or 12b, 12b, respectively. All component parts of the two external rear-view mirrors 1a, 1b that are largely or completely identical with FIG. 1 have the same reference numeral as in FIG. 1 with "a" or "b" suffixed, but without a renewed description. As far as the control unit 16ab comprises parts identical with or similar to FIG. 1, they have the same reference numeral with "ab" suffixed.

A mirror switch 24ab with a rotary switch 25ab and a slide switch 26ab are provided in the control unit 16ab, the rotary switch 25ab serving in this case to switch from the external rear-view mirror 1a to the external rear-view mirror 1b and vice versa. Otherwise the function is identical with that of the embodiment according to FIG. 1. The transmitting unit 17ab receives its control signals from the mirror switch 24ab or the on-off switch 23ab for the heating 14a, 14b. The signals coded in the transmitting unit 17ab correspondingly pass to the receiving unit 20a and 20b, respectively, via the lines 18a, 19a forming a data bus for the receiving unit 20a of the external rear-view mirror 1a, and the lines 18b, 19b forming a data bus for the receiving unit 20b of the external rear-view mirror 1b. In this case two data busses 18a, 19a and 18b, 19b, respectively, are available which are supplied by a transmitting unit 17ab and which lead to receiving units 20a, 20b independent of each other. There the coded signals are again correspondingly translated so that either the heating 14a and 14b, respectively, or the servomotors 11a, 12a and 11b, 12b, respectively, are triggered.

Figure 3:
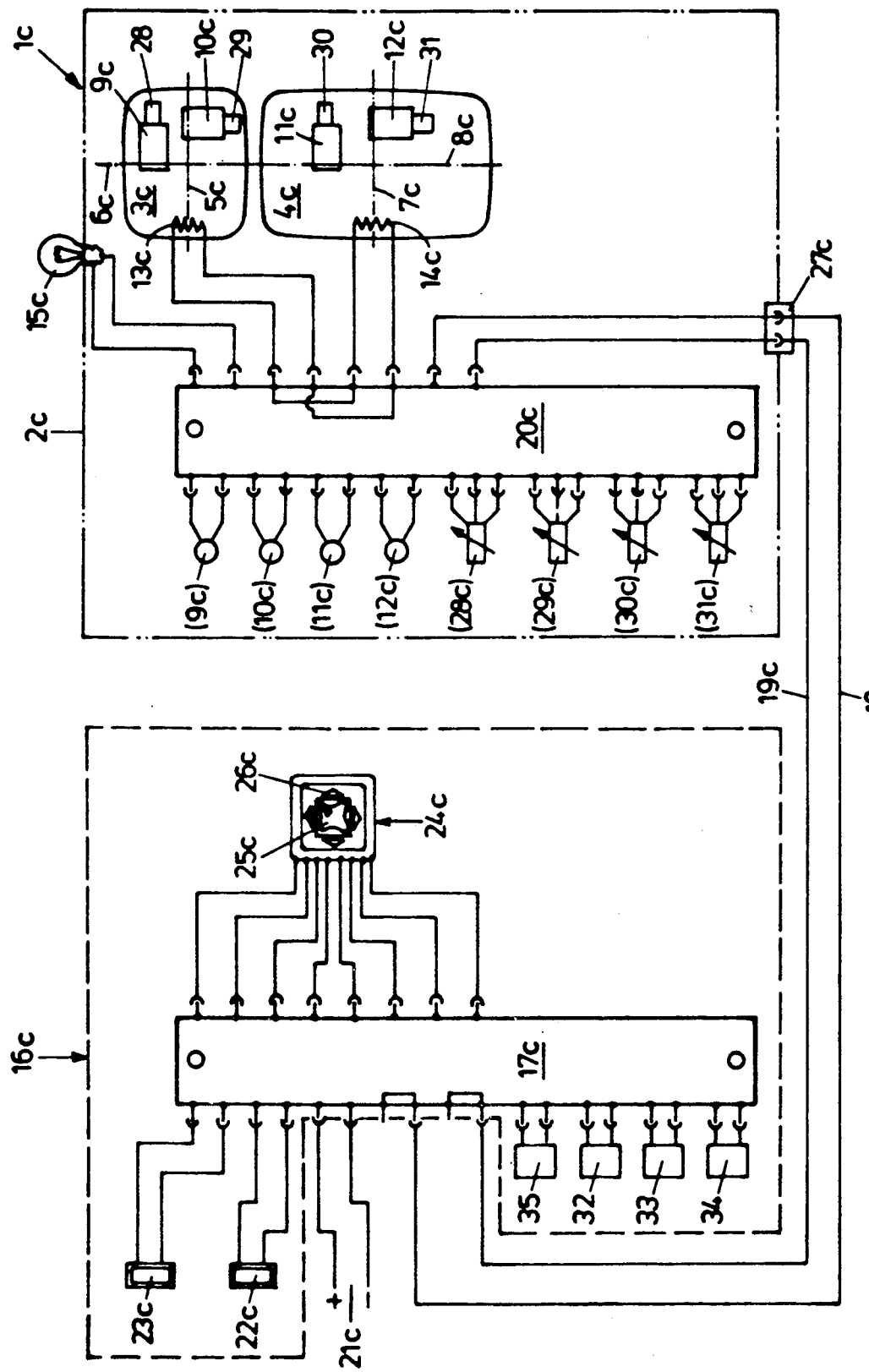
FIG. 3 shows an external rear-view mirror with a control unit according to FIG. 1 with a memory system for the mirror position being provided additionally.

FIG. 3 shows a third embodiment with an external rear-view mirror 1c substantially identical with that according to FIG. 1. Including the control unit 16c it differs from the embodiment according to FIG. 1 only in that the multiplex system is additionally provided with a memory circuit. As far as this there is no need of a renewed description of all the parts identical with FIG. 1 which are designated with the same reference numeral with "c" suffixed. The servomotors 9c, 10c, 11c, 12c are provided with a rotary position indicator 28, 29, 30, 31 detecting the rotary position of the corresponding motors 9c, 10c, 11c, 12c. It gives a corresponding signal to the receiving unit 20c. Such rotary position indicators can be formed by rotary potentiometers, slide potentiometers, but also by digitally operating impulse emitters.

The rotary position signals produced by these rotary position indicators 28, 29, 30, 31 are returned to the transmitting unit 17c via the data busses formed by the lines 18c, 19c. These signals can be stored in the transmitting unit 17c and that by corresponding actuation of a storage location key 32 or 33 or 34 electing a storage location and by a storage switch 35 triggering a storage process. With the described embodiment according to FIG. 3 a displacement or adjustment of the mirror glasses 3c or 4c, respectively, can be carried out via the data bus 18c, 19c on the one hand. A driver can store this position for example via the storage location key 32 in the associated storage location. If meanwhile the position of the mirror glasses 3c, 4c has been changed, then the corresponding adjustment can be recalled and carried out by simple actuation of the storage location key 32. Thus, a position of the mirror glasses 3c, 4c can be associated with each of a plurality of drivers by the storage location keys 32, 33, 34 and can be re-adjusted in a simple manner.

Figure 4:
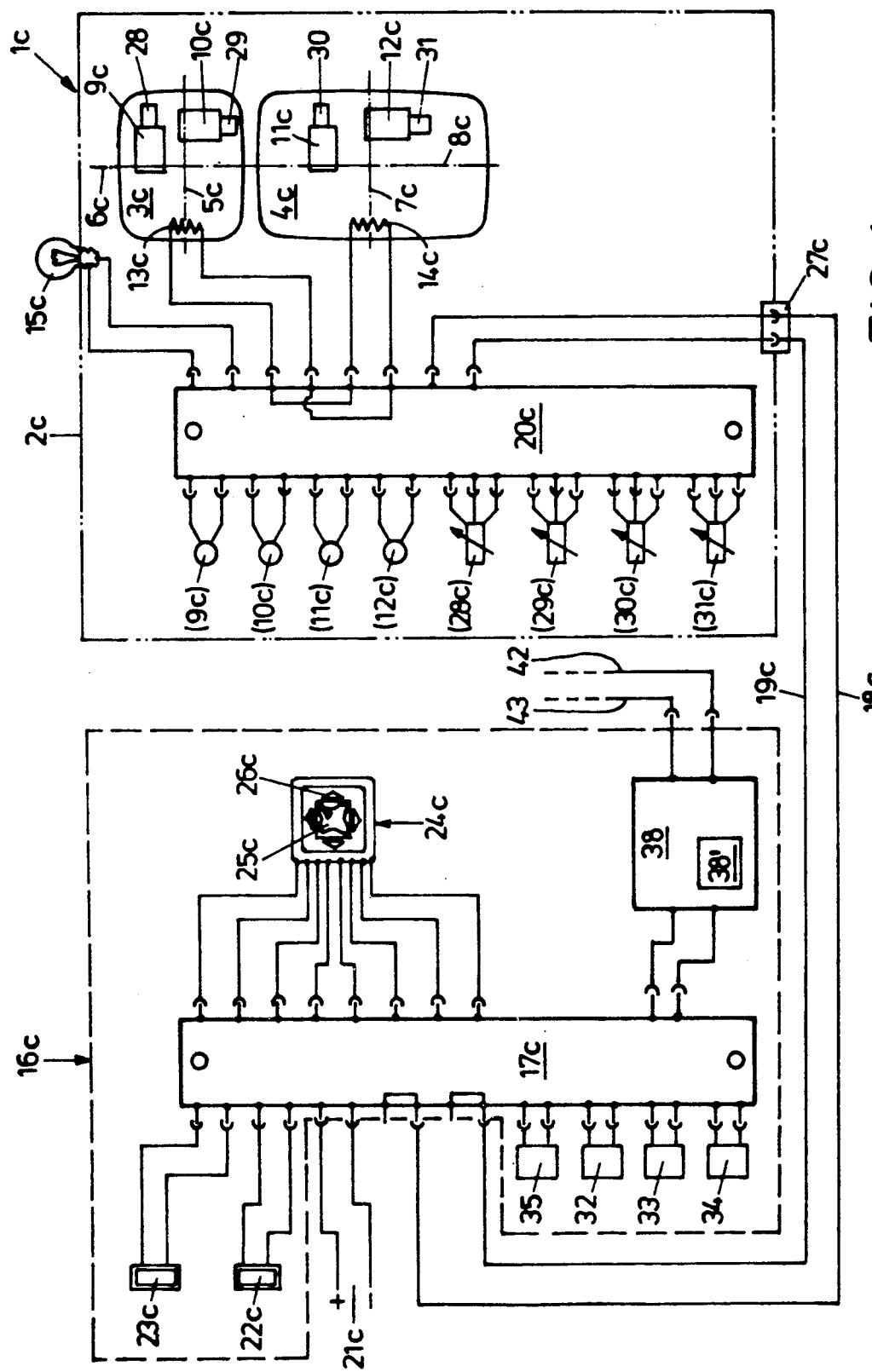
FIG. 4 shows an external rear-view mirror with a control unit with a memory system according to FIG. 3, with parts of an adjustment device for the mirror position being provided additionally.
Figure 5:
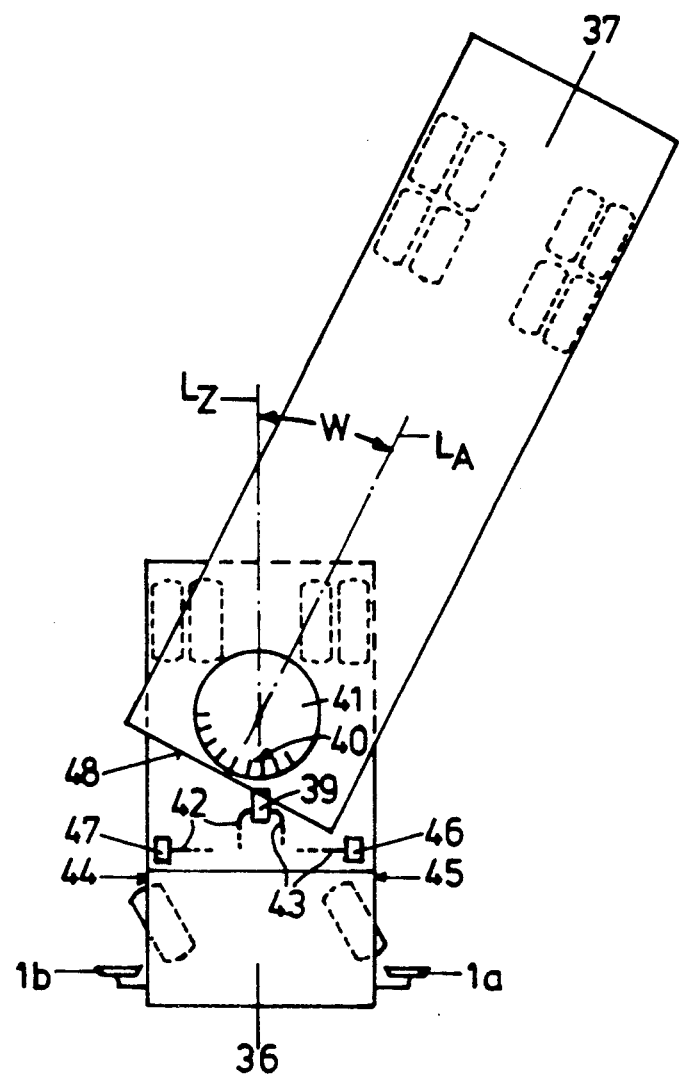
FIG. 5 shows a diagrammatic plan view of a tractor with further parts of the adjustment device.

A further advantageous additional device for the rear-view unit becomes apparent from FIGS. 4 and 5, which is used for a vehicle with a trailer and in particular a truck with a trailer or a tractor with a truck and a semi-trailer. This is an angle detection equipment connected with the transmitting unit 17c of the multiplex system, by means of which the position of the mirror glass or mirror glasses 3c, 4c can be corrected by way of the multiplex system according to the angle W between the longitudinal axes $L_Z$, $L_A$ parallel to the direction of travel of the truck 36 and the semi-trailer 37.

The angle detection equipment consists of an angle transmitter responding to a change of the angle formed between the truck 36 and the semi-trailer 37 and an evaluation unit 38. The angle transmitter is connected with the input of the evaluation unit 38, the output of which is connected with the transmitting unit 17c of the multiplex system to control the mirror (FIG. 4).

In FIG. 5 two alternatives of the angle transmitter are diagrammatically outlined which can be used alternately. On the one hand, it is an incremental position transducer 39 on electro-optical basis, with the help of which an angle mark 40 in the vicinity of the rotary table 41 of the semi-trailer 37 can be read. When the truck 36 is turned in and the angle W between the semi-trailer 37 and the truck 36 correspondingly grows, the angle marks 40 run past the electro-optical incremental position transducer 39, the latter produces electric signals which are fed via connection lines 42, 43 to the evaluation unit 38. From the impulse-like signals the latter determines corresponding control signals for the correction of the mirror position which, similar to the function of the storage location keys 32, 33, 34, are fed from a storage device 38' into the transmitting unit 17c and are passed on to the receiving unit 20c via the lines 18c, 19c. If for instance an angle W of 20° is registered, the mirror glass 4c controlled by the multiplex system rotates outwards by a corresponding angle about its vertical positioning axis 8c.

In an alternative embodiment the angle transmitter is formed by two distance sensors 46, 47 arranged in the field of the side walls 44, 45 of the truck 36 facing away from each other. These sensors 46, 47 measure the respective distance between the two lateral regions of the front side 48 of the semi-trailer 37 in the vicinity of the side walls 44, 45 and the distance sensors 46, 47. The distance sensors, 46, 47 can be ultrasonic sensors or infrared sensors. They generate a signal proportional to the specific distance which is fed via the connection lines 42 and 43, respectively, to the evaluation unit 38. The latter computes the angle W on the basis of the different distances measured and in turn generates a corresponding control signal for the transmitting unit 17c, which is in turn fed to the receiving unit 20c for moving of the mirror glass 4c to track the angle.

It must be emphasized that the evaluation unit 38 can also be integrated into the transmitting unit 17c.

It has to be added to FIGS. 1-4 that the data bus consisting of the two lines 18, 18a, 18b, 18c, 19, 19a, 19b, 19c can be formed from a ground line 18, 18a, 18b, 18c and from a supply line 19, 19a, 19b, 19c, the data signals transmitted in form of a frequency modulated voltage signal between the multiplex transmitting unit 17, 17ab, 17c and the multiplex receiving unit 20, 20a, 20b, 20c being sent via the ground line 18, 18a, 18b, 18c. A data transmission via the supply line 19, 19a, 19b, 19c, however, is also possible.

Summarizing, a modular system is created by the multiplex data transmission system provided according to the invention, which allows to control differently equipped rear-view units at motor-vehicles by the retention of only two connection lines. As by that no vehicle components relevant to security are concerned, the multiplex system can be designed simply and without any redundancy equipments.

What is claimed is:

1. A rear-view unit for motor-vehicles with at least one external rear-view mirror (1, 1a, 1b, 1c) comprising a housing (2, 2a, 2b, 2c),
   at least one pivotable mirror glass (3, 4; 4a, 4b; 3c, 4c) provided with a heating element (13, 14; 14a, 14b; 13c, 14c),
   at least one electric servomotor (9, 10, 11, 12; 11a, 11b, 12a, 12b; 9c, 10c, 11c, 12c) for pivoting at least the mirror glass (3, 4; 4a, 4b; 3c, 4c) about a positioning axis (5, 6, 7, 8a; 7a, 8a, 8b; 5c, 6c, 7c, 8c);
   a mirror switch (24, 24ab, 24c) remote from said housing (2, 2a, 2b, 2c) to connect said at least one servomotor (9, 10, 11, 12; 11a, 11b, 12a, 12b; 9c, 10c, 11c, 12c) with a current supply (21, 21ab, 21c) via at least one electric line (18, 19; 18a, 19a, 18b, 19b; 18c, 19c);
   said mirror switch (24, 24ab, 24c) is connected to said transmitting unit (17, 17ab, 17c) and said at least one servomotor (9, 10, 11, 12; 11a, 11b, 12a, 12b; 9c, 10c, 11c, 12c) is connected to said receiving unit (20; 20a, 20b; 20c);
   said heating element is connected to a receiving unit (20; 20a, 20b; 20c) of a multiplex system arranged in said housing (2, 2a, 2b, 2c);
   an on-off switch (23, 23ab, 23c) for said heating element (13, 14; 14a, 14b; 13c, 14c) connected to a transmitting unit (17, 17ab, 17c);
   and wherein said at least one electric line (18, 19; 18a, 19a, 18b, 19b; 18c, 19c) is in the form of a data bus between said transmitting unit 17, 17ab, 17c) and said receiving unit (20; 20a; 20b; 20c).

2. A rear-view unit according to claim 1, wherein two servomotors (9, 10, 11, 12; 11a, 11b, 12a, 12b; 9c, 10c, 11c, 12c) are provided for each mirror glass (3, 4; 4a, 4b; 3c, 4c), which are connected to the receiving unit (20; 20a, 20b; 20c).

3. A rear-view unit according to claim 1, wherein at least two external rear-view mirrors (1a, 1b) are provided with a receiving unit (20a, 20b) each and are connected with a common transmitting unit (17ab) via data busses (18a, 19a, 18b, 19b).

4. A rear-view unit according to claim 1, wherein said at least one servomotor (9c, 10c, 11c, 12c) is connected with a rotary position indicator (28, 29, 30, 31), which is connected to said receiving unit (20c), and wherein said transmitting unit (17c) is provided with at least one storage location triggerable by way of a storage location key (32, 33, 34) and a storage switch (35) to store and repeatedly trigger a predeterminable position of said at least one mirror glass (3c, 4c).

5. A rear-view unit according to claim 1, wherein at maximum two electric lines (18, 19; 18a, 19a, 18b; 19b; 18c, 19c) are provided, the first being a ground line (18, 18a, 18b, 18c) and the second being a supply line (19, 19a, 19b, 19c) and that the multiplex signal is transmittable via one of the two lines.

6. A rear-view unit according to claim 1 for a truck (36) with a trailer (semi-trailer 37), wherein said transmitting unit (17c) of said multiplex system is associated with an angle detection equipment detecting an angle (W) between longitudinal axes ($L_Z$, $L_A$) parallel to the direction of travel of said truck (36) and trailer (semi-trailer 37), by means of which equipment the position of said at least one mirror glass (3c, 4c) is automatically adjustable corresponding to said angle (W) via said multiplex system.

7. A rear-view unit for motor-vehicles with at least one external rear-view mirror (1, 1a, 1b, 1c) comprising a housing (2, 2a, 2b, 2c),
   at least one pivotable mirror glass (3, 4; 4a, 4b; 3c, 4c),
   at least one electric servomotor (9, 10, 11, 12; 11a, 11b, 12a, 12b; 9c, 10c, 11c, 12c) for pivoting at least the mirror glass (3, 4; 4a, 4b; 3c, 4c) about a positioning axis (5, 6, 7, 8; 7a, 8a, 8b; 5c, 6c, 7c, 8c),
   a mirror switch (24, 24ab, 24c) remote from said housing (2, 2a, 2b, 2c) to connect said at least one servomotor (9, 10, 11, 12; 11a, 11b, 12a12b; 9c, 10c, 11c, 12c) with a current supply (21, 21ab, 21c) via at least one electric line (18, 19; 18a, 19a, 18b, 19b; 18c, 19c),
   said mirror switch (24, 24ab, 24c) connected to a transmitting unit (17, 17ab, 17c) and said at least one servomotor (9, 10, 11, 12; 11a, 11b, 12a, 12b, 9c, 10c, 11c, 12c) is connected to a receiving unit (20; 20a, 20b; 20c) of a multiplex system arranged in said housing (2, 2a, 2b, 2c,
   at least one lamp (15, 15c) arranged on said housing (2, 2a, 2b, 2c) and is connected to said receiving unit (20, 20c) and wherein an on-off switch (22, 22c) for said lamp (15, 15c) is connected to said transmitting unit (17, 17c) and wherein said at least one electric line (18, 19; 18a, 19a, 18b, 19b; 18c, 19c) is in the form of a data bus between said transmitting unit (17, 17ab, 17c) and said receiving unit (20; 20a; 20b; 20c).

8. A rear-view unit according to claim 7, wherein at least two external rear-view mirrors (1a, 1b) are provided with a receiving unit (20a, 20b) each and are connected with a common transmitting unit (17ab) via data busses (18a, 19a, 18b, 19b).

9. A rear-view unit according to claim 7 wherein at least one mirror glass (3, 4; 4a, 4b; 3c, 4c) is provided with a heating element (13, 14; 14a, 14b; 13c, 14c), which is connected to the receiving unit (20; 20a, 20b; 20c), and wherein an on-off switch (23, 23ab, 23c) for said heating element (13, 14; 14a, 14b; 13c, 14c) is connected to said transmitting unit (17, 17ab, 17c).

10. A rear-view unit according to claim 7 wherein said at least one servomotor (9c, 10c, 11c, 12c) is connected with a rotary position indicator (28, 29, 30, 31), which is connected to said receiving unit (20c), and wherein said transmitting unit (17c) is provided with at least one storage location triggerable by way of a storage location key (32, 33, 34) and a storage switch (35) to store and repeatedly trigger a predeterminable position of said at least one mirror glass (3c, 4c).

11. A rear-view unit according to claim 7, wherein at maximum two electric lines (18, 19, 18a, 19a, 18b, 19b; 18c, 19c) are provided, the first being a ground line (18, 18a, 18b, 18c) and the second being a supply line (19, 19a, 19b, 19c) and that the multiplex signal is transmittable via one of the two lines.

12. A rear-view unit according to claim 7 for a truck (36) with a trailer (semi-trailer 37), wherein said transmitting unit (17c) of said multiplex system is associated with an angle detection equipment detecting an angle (W) between longitudinal axes ($L_Z$, $L_A$) parallel to the direction of travel of said truck (36) and trailer (semi-trailer 37), by means of which equipment the position of said at least one mirror glass (3c, 4c) is automatically adjustable corresponding to said angle (W) via said multiplex system.

13. A rear-view unit for a truck (36) with a trailer (semi-trailer 37) and with at least one external rear-view mirror (1, 1a, 1b, 1c) comprising a housing (2, 2a, 2b, 2c), at least one pivotable mirror glass (3, 4; 4a, 4b; 3c, 4c) at least one electric servomotor (9, 10, 11, 12; 11a, 11b, 12a, 12b; 9c, 10c, 11c, 12c) for pivoting at least the mirror glass (3, 4; 4a, 4b; 3c, 4c) about a positioning axis (5, 6, 7, 8a; 7a, 8a, 8b, 5c, 6c, 7c, 8c);

a mirror switch (24, 24ab, 24c) remote from said housing (2, 2a, 2b, 2c) to connect said at least one servomotor (9, 10, 11, 12; 11a, 11b, 12a, 12b; 9c, 10c, 11c, 12c) with a current supply (21, 21ab, 21c) via at least one electric line (18, 19; 18a, 19a, 18b, 19b; 18c, 19c);

said mirror switch (24, 24ab, 24c) is connected to a transmitting unit (17, 17ab, 17c) and said at least one servomotor (9, 10, 11, 12; 11a, 11b, 12a, 12b, 9c, 10c, 11c, 12c) is connected to a receiving unit (20; 20a, 20b; 20c); of a multiplex system arranged in said housing (2, 2a, 2b, 2c), said at least one electric line (18, 19; 18a, 19a, 18b, 19b; 18c, 19c) being in the form of a data bus between said transmitting unit 17, 17ab, 17c) and said receiving unit (20; 20a; 20b; 20c), said transmitting unit (17c) of said multiplex system is associated with an angle detection equipment detecting an angle (W) between longitudinal axes $L_Z$, $L_A$) parallel to the direction of travel of said truck (36) and trailer (semi-trailer 37), by means of which equipment the position of said at least one mirror glass (3c, 4c) is automatically adjustable corresponding to said angle (W) via said multiplex system;

said angle detection equipment comprises at least one angle transmitter responding to a change of angle between said truck (36) and said trailer (semi-trailer 37) and an evaluation unit (38) to generate control signals for the adjustment of the mirror position, the input of which evaluation unit (38) is connected with said angle transmitter, and the output of which evaluation unit (38) is connected with said transmitting unit (17c), and two distance sensors (46, 47) each arranged in the vicinity of side walls (44, 45) of said truck (36) facing away from one another are provided as angle transmitters, by means of each of which a signal can be generated for said evaluation unit (38), which signal corresponds to the respective distance between lateral regions of a front (48) of said trailer (semi-trailer 37) in the vicinity of said side walls (44, 45) and said distance sensors (46, 47).

14. A rear-view unit according to claim 13, wherein said angle transmitter is an incremental transducer (39) by means of which an angle mark (40) on said trailer (semi-trailer 37) is detectable.

15. A rear-view unit according to claim 13 wherein at least two external rear-view mirrors (1a, 1b) are provided with a receiving unit (20a, 20b,) each and are connected with a common transmitting unit (17ab) via data busses (18a, 19a, 18b, 19b).

16. A rear-view unit according to claim 13, wherein at least one mirror glass (3, 4; 4a, 4b; 3c, 4c) is provided with a heating element (13, 14; 14a, 14b; 13c, 14c), which is connected to the receiving unit (20; 20a, 20b, 20c), and wherein an on-off switch (23, 23ab, 23c) for said heating element (13, 14; 14a, 14b; 13c, 14c) is connected to said transmitting unit (17, 17ab, 17c).

17. A rear-view unit according to claim 13, wherein at least one lamp (15, 15c) is arranged on said housing (2, 2a, 2b, 2c) and is connected to said receiving unit (20, 20c) and wherein an on-off switch (22, 22c) for said lamp (15, 15c) is connected to said transmitting unit (17, 17c).

18. A rear-view unit according to claim 13, wherein said at least one servomotor (9c, 10c, 11c, 12c) is connected with a rotary position indicator (28, 29, 30, 31), which is connected to said receiving unit (20c), and wherein said transmitting unit (17c) is provided with at least one storage location triggerable by way of a storage location key (32, 33, 34) and a storage switch (35) to store and repeatedly trigger a predeterminable position of said 19. A rear-view unit according to claim 13, wherein at maximum two electric lines (18, 19, 18a, 19a, 18b, 19b, 18c, 19c) are provided, the first being a ground line (18, 18a, 18b, 18c) and the second being a supply line (19, 19a, 19b, 19c) and that the multiplex signal is transmittable via one of the two lines.

* * * * *

(12) EX PARTE REEXAMINATION CERTIFICATE (6693rd)
United States Patent
Lang et al.

(10) Number: US 5,196,965 C1
(45) Certificate Issued: Mar. 10, 2009

(54) REAR-VIEW UNIT FOR MOTOR-VEHICLES

(75) Inventors: Heinrich Lang, Ergersheim (DE); Wolfgang Seiboth, Bad Windsheim (DE)

(73) Assignee: Mekra Rangau Plastics GmbH & Co KG, Furth (DE)

Reexamination Request:
No. 90/008,006, Apr. 14, 2006

Reexamination Certificate for:
Patent No.: 5,196,965
Issued: Mar. 23, 1993
Appl. No.: 07/764,502
Filed: Sep. 20, 1991

(30) Foreign Application Priority Data

Sep. 21, 1990 (DE) .............................. 4029890

(51) Int. Cl.
*B60R 1/07* (2006.01)
*B60R 1/02* (2006.01)
*B60R 1/062* (2006.01)

(52) U.S. Cl. .................. 359/841; 359/843; 359/876; 359/877

(58) Field of Classification Search ........................ None
See application file for complete search history.

(56) References Cited

U.S. PATENT DOCUMENTS

| 4,037,286 | A | * | 7/1977 | Medearis et al. | ......... 15/250.05 |
| 4,820,032 | A | * | 4/1989 | Thompson, Jr. | ............. 359/843 |
| 4,890,907 | A | * | 1/1990 | Vu et al. | ..................... 359/843 |
| 4,940,322 | A | * | 7/1990 | Hamamoto et al. | ......... 359/873 |
| 5,056,905 | A | * | 10/1991 | Jensen | ........................ 359/843 |

FOREIGN PATENT DOCUMENTS

GB          EU0274848 A1  *  7/1988

* cited by examiner

*Primary Examiner*—Minh T Nguyen

(57) ABSTRACT

A rear-view unit for motor-vehicles, in particular commercial vehicles, has at least one external rear-view mirror with a housing and at least one mirror glass pivotably arranged in the housing. Electric servomotors are provided to pivot the mirror glasses about a positioning axis. Furthermore, heatings for the mirror glass may be available. Switches are provided to actuate the servomotors and the heating. So as to reduce the wiring and to ensure the subsequent equipment of adjustable mirror glasses with servomotors, the switches are connected to a transmitting unit and the servomotors are connected to a receiving unit of a multiplex system arranged in the housing.

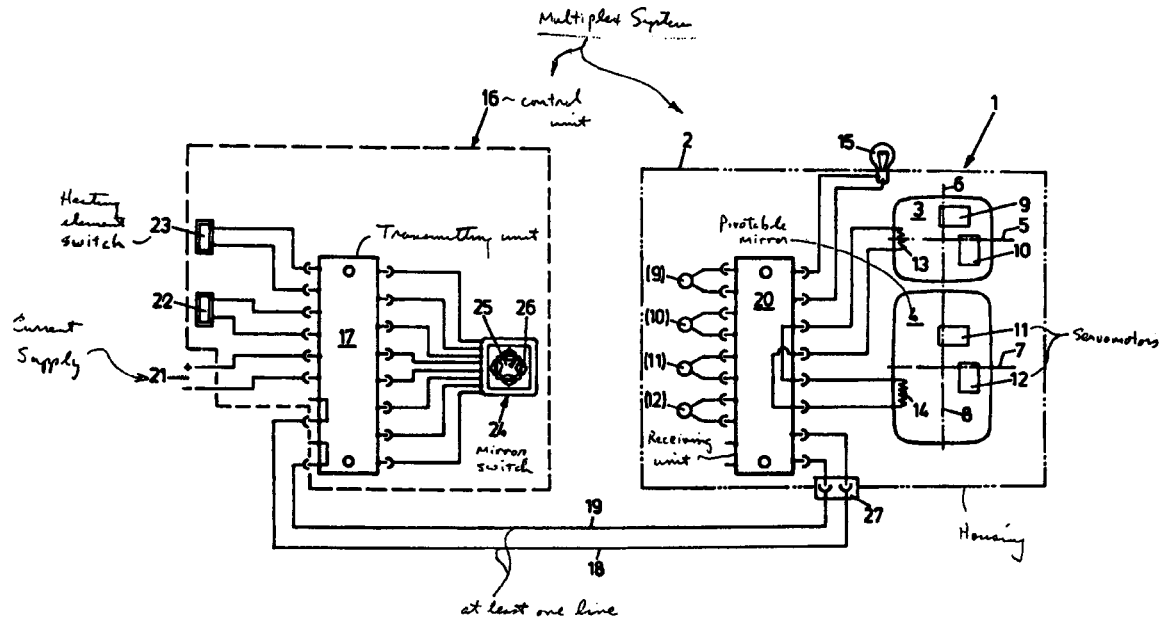

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 13–17 and 19 is confirmed.

Claims 5 and 11 are cancelled.

Claims 1, 7 and 18 are determined to be patentable as amended.

Claims 2–4, 6, 8–10 and 12, dependent on an amended claim, are determined to be patentable.

1. A rear-view unit for motor-vehicles with at least one external rear-view mirror (1, 1a, 1b, 1c) comprising
a housing (2, 2a, 2b, 2c),
at least one pivotable mirror glass (3, 4; 4a, 4b; 3c, 4c) provided with a heating element (13, 14; 14a, 14b; 13c, 14c),
at least one electric servomotor (9, 10, 11, 12; 11a, 11b, 12a, 12b; 9c, 10c, 11c, 12c) for pivoting at least the mirror glass (3, 4; 4a, 4b; 3c, 4c) about a positioning axis (5, 6, 7, 8a; 7a, 8a, 8b, 5c, 6c, 7c, 8c);
a mirror switch (24, 24ab, 24c) remote from said housing (2, 2a, 2b, 2c) to connect said at least one servomotor (9, 10, 11, 12; 11a, 11b, 12a, 12b; 9c, 10c, 11c, 12c) with a current supply (21, 21ab, 21c) via at least one electric line (18, 19; 18a, 19a, 18b, 19b; 18c, 19c);
said mirror switch (24, 24ab, 24c) is connected to said transmitting unit (17, 17ab, 17c) and said at least one servomotor (9, 10, 11, 12; 11a, 11b, 12a, 12b, 9c, 10c, 11c, 12c) is connected to said receiving unit (20; 20a, 20b; 20c);
said heating element is connected to a receiving unit (20; 20a, 20b; 20c) of a multiplex system arranged in said housing (2, 2a, 2b, 2c);
an on-off switch (23, 23ab, 23c) for said heating element (13, 14; 14a, 14b; 13c, 14c) connected to a transmitting unit (17, 17ab, 17c);
and wherein said at least one electric line (18, 19; 18a, 19a, 18b, 19b; 18c, 19c) is in the form of a data bus between said transmitting unit 17, 17ab, 17c) and said receiving unit (20; 20a; 20b; 20c),
*and wherein at maximum two electric lines (18, 19; 18a, 19a, 18b; 19b; 18c, 19c) are provided, the first being a ground line (18, 18a, 18b, 18c) and the second being a supply line (19, 19a, 19b, 19c) and that the multiplex signal is transmittable via one of the two lines.*

7. A rear-view unit for motor-vehicles with at least one external rear-view mirror (1, 1a, 1b, 1c) comprising
a housing (2, 2a, 2b, 2c),
at least one pivotable mirror glass (3, 4; 4a, 4b; 3c, 4c),
at least one electric servomotor (9, 10, 11, 12; 11a, 11b, 12a, 12b; 9c, 10c, 11c, 12c) for pivoting at least the mirror glass (3, 4; 4a, 4b; 3c, 4c) about a positioning axis 5, 6, 7, 8; 7a, 8a, 8b; 5c, 6c, 7c, 8c),
a mirror switch (24, 24ab, 24c) remote from said housing (2, 2a, 2b, 2c) to connect said at least one servomotor (9, 10, 11, 12; 11a, 11b, 12a12b; 9c, 10c, 11c, 12c) with a current supply (21, 21ab, 21c) via at least one electric line (18, 19; 18a, 19a, 18b, 19b; 18c, 19c),
said mirror switch (24, 24ab, 24c) connected to a transmitting unit (17, 17ab, 17c) and said at least one servomotor (9, 10, 11, 12; 11a, 11b, 12a, 12b, 9c, 10c, 11c, 12c) is connected to a receiving unit (20; 20a, 20b; 20c) of a multiplex system arranged in said housing (2, 2a, 2b, 2c,
at least one lamp (15, 15c) arranged on said housing (2, 2a, 2b, 2c) and is connected to said receiving unit (20, 20c) and wherein an on-off switch (22, 22c) for said lamp (15, 15c) is connected to said transmitting unit (17, 17c) and wherein said at least one electric line (18, 19; 18a, 19a, 18b, 19b; 18c, 19c) is in the form of a data bus between said transmitting unit (17, 17ab, 17c) and said receiving unit (20; 20a; 20b; 20c), *and wherein at maximum two electric lines (18, 19, 18a, 19a, 18b, 19b; 18c, 19c) are provided, the first being a ground line (18, 18a, 18b, 18c) and the second being a supply line (19, 19a, 19b, 19c) and that the multiplex signal is transmittable via one of the two lines.*

18. A rear-view unit according to claim 13, wherein said at least one servomotor (9c, 10c, 11c, 12c) is connected with a rotary position indicator (28, 29, 30, 31), which is connected to said receiving unit (20c), and wherein said transmitting unit (17c) is provided with a least one storage location triggerable by way of a storage location key (32, 33, 34) and a storage switch (35) to store and repeatedly trigger a predeterminable position of said *at least one mirror glass (3c, 4c).*

\* \* \* \* \*